United States Patent
Leone et al.

(10) Patent No.: US 11,519,354 B1
(45) Date of Patent: Dec. 6, 2022

(54) METHODS AND SYSTEM FOR STOPPING AN ENGINE

(71) Applicant: Ford Global Technologies, LLC, Dearborn, MI (US)

(72) Inventors: Thomas Leone, Ypsilanti, MI (US); Chris Glugla, Macomb, MI (US); Kenneth Miller, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/444,627

(22) Filed: Aug. 6, 2021

(51) Int. Cl.
| | | |
|---|---|---|
| F02D 41/04 | (2006.01) | |
| F02D 41/38 | (2006.01) | |
| F02N 11/08 | (2006.01) | |
| F02D 13/02 | (2006.01) | |
| F02D 41/00 | (2006.01) | |
| F02N 11/04 | (2006.01) | |
| F02D 41/32 | (2006.01) | |

(52) U.S. Cl.
CPC ....... *F02D 41/042* (2013.01); *F02D 13/0234* (2013.01); *F02D 41/0002* (2013.01); *F02D 41/32* (2013.01); *F02D 41/38* (2013.01); *F02N 11/04* (2013.01); *F02N 11/087* (2013.01); *F02D 2200/021* (2013.01); *F02D 2200/0614* (2013.01); *F02D 2200/50* (2013.01); *F02D 2200/70* (2013.01)

(58) Field of Classification Search
CPC ............... F02D 41/042; F02D 13/0234; F02D 41/0002; F02D 41/32; F02D 41/38; F02D 2200/021; F02D 2200/0614; F02D 2200/50; F02D 2200/70; F02N 11/04; F02N 11/087
See application file for complete search history.

(56) References Cited

U.S. PATENT DOCUMENTS

| | | | |
|---|---|---|---|
| RE36,737 E | 6/2000 | Brehob et al. | |
| 8,671,902 B2 | 3/2014 | Aso et al. | |
| 9,708,999 B2 | 7/2017 | Surnilla et al. | |
| 10,167,806 B2 | 1/2019 | Surnilla et al. | |
| 10,914,249 B2 | 2/2021 | Dudar | |
| 2002/0103055 A1* | 8/2002 | Tani .................. | B60W 10/18 477/115 |
| 2005/0166896 A1* | 8/2005 | Sadakane ............. | F02D 41/40 123/431 |
| 2006/0048734 A1* | 3/2006 | Kataoka ............... | F02N 11/04 701/112 |
| 2008/0103683 A1* | 5/2008 | Tabata ................. | F02D 41/042 701/112 |
| 2010/0101536 A1* | 4/2010 | Nakata ................. | F02M 69/54 123/457 |

(Continued)

FOREIGN PATENT DOCUMENTS

| | | | |
|---|---|---|---|
| EP | 1344901 A2 | 9/2003 | |
| JP | 2007113469 A | 5/2007 | |
| JP | 2013194679 A | * | 9/2013 |

*Primary Examiner* — Joseph J Dallo
(74) *Attorney, Agent, or Firm* — Vincent Mastrogiacomo; McCoy Russell LLP

(57) ABSTRACT

Systems and methods for stopping an engine of a vehicle are described. In one example, the method anticipates when an engine is expected to stop and modifies engine operation so that less fuel is in the engine's intake ports when the engine is stopped so that the fuel may not escape the engine when the engine is restarted.

19 Claims, 4 Drawing Sheets

(56) References Cited

U.S. PATENT DOCUMENTS

| | | |
|---|---|---|
| 2013/0018564 A1 | 1/2013 | Coatesworth et al. |
| 2014/0046577 A1 | 2/2014 | Wang et al. |
| 2015/0114339 A1 | 4/2015 | Sellnau et al. |
| 2018/0215386 A1* | 8/2018 | Naserian ............. F02N 11/0837 |

* cited by examiner

US 11,519,354 B1

METHODS AND SYSTEM FOR STOPPING AN ENGINE

FIELD

The present description relates to methods and a system for stopping an engine of a vehicle.

BACKGROUND AND SUMMARY

An engine may be stopped and it may be restarted when the engine is needed. Before the engine is stopped, fuel may be injected into the engine and some of the injected fuel may attach to engine cylinder ports to form fuel puddles. The fuel puddles may remain in the engine's cylinder ports or at least some of the fuel puddles may be drawn into engine cylinders where it remains until the engine is restarted. During an engine restart, the engine may be rotated without being fueled during a process that may be referred to as "cranking" the engine. Fuel puddles in the engine's cylinder ports and fuel held in engine cylinders may be ejected from the engine and into an exhaust system where the fuel may pass over a catalyst that has not achieved its light off temperature. Consequently, raw hydrocarbons may be ejected from the engine without being combusted. These hydrocarbons may be a significant source of engine emissions during a drive cycle of a vehicle. Therefore, it may be desirable to provide a way of reducing hydrocarbons that exit the engine during engine cranking.

The inventors herein have recognized the above-mentioned issues and have developed a method for stopping an engine, comprising: ceasing to supply fuel to an engine via a controller based on an anticipated engine stop request; and supplying fuel to the engine via the controller a predetermined amount of time after ceasing to supply fuel to the engine based on the anticipated engine stop request.

By ceasing fuel flow to an engine based on an anticipated engine stop request, it may be possible to reduce fuel puddles in the engine without significantly extending an engine stopping duration. The reduced fuel puddles may lead to lower hydrocarbon emissions when the engine is subsequently restarted. In addition, if an engine stop is not requested within a threshold amount of time since fuel injection was ceased due to an anticipated engine stop request, the engine may be restarted by supplying fuel to the engine before the engine is actually stopped. Consequently, operation of the engine may be nearly seamless.

The present description may provide several advantages. In particular, the approach may reduce engine emissions when an engine is restarted. Further, the approach may allow engine operation to be nearly seamless if an actual engine stop is not requested. In addition, at least portions of the approach may be applied even when an engine stop request is not anticipated so that engine emissions during engine restarting may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
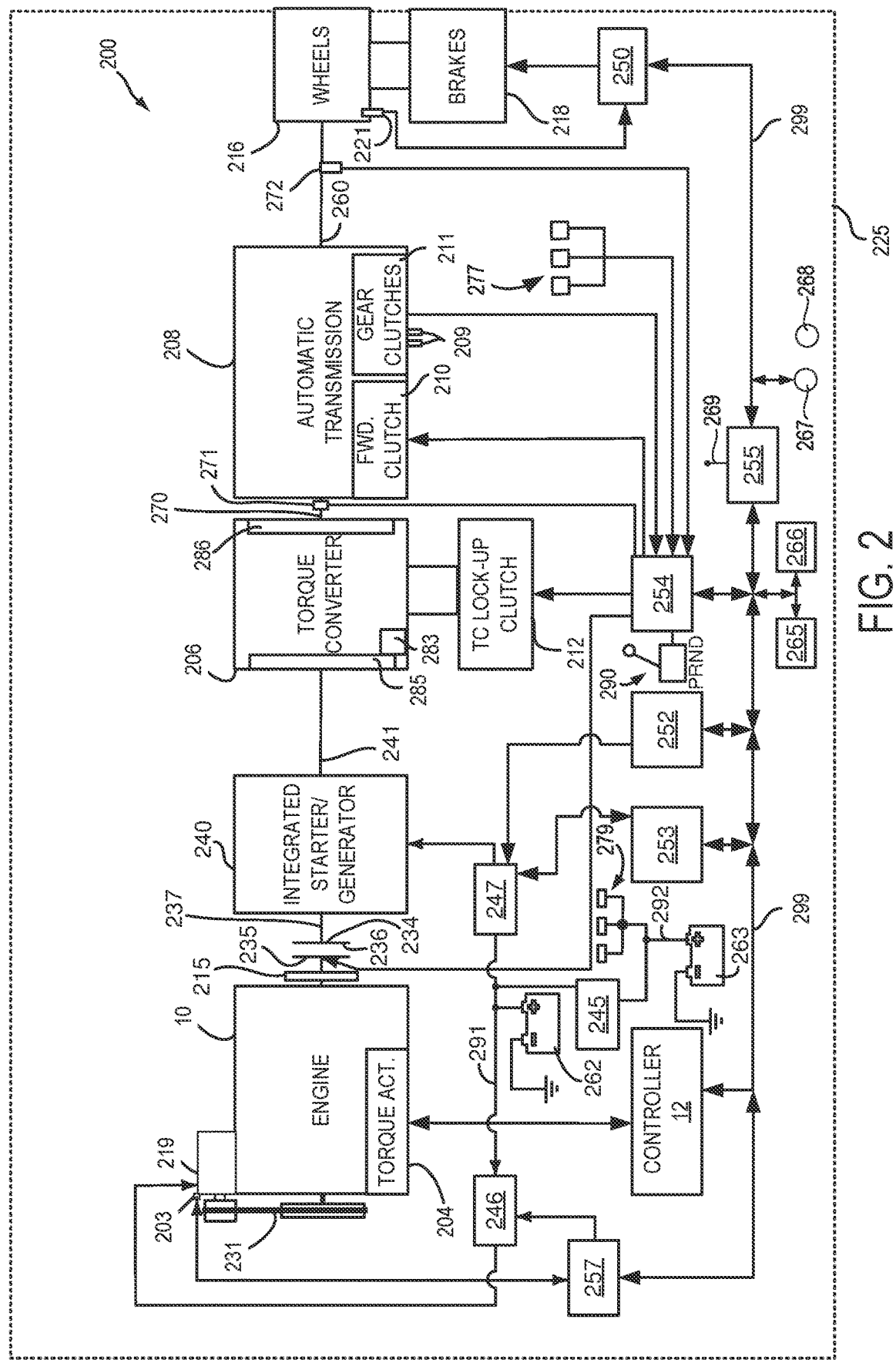
FIG. 2 is a schematic diagram of a vehicle driveline.
Figure 3:
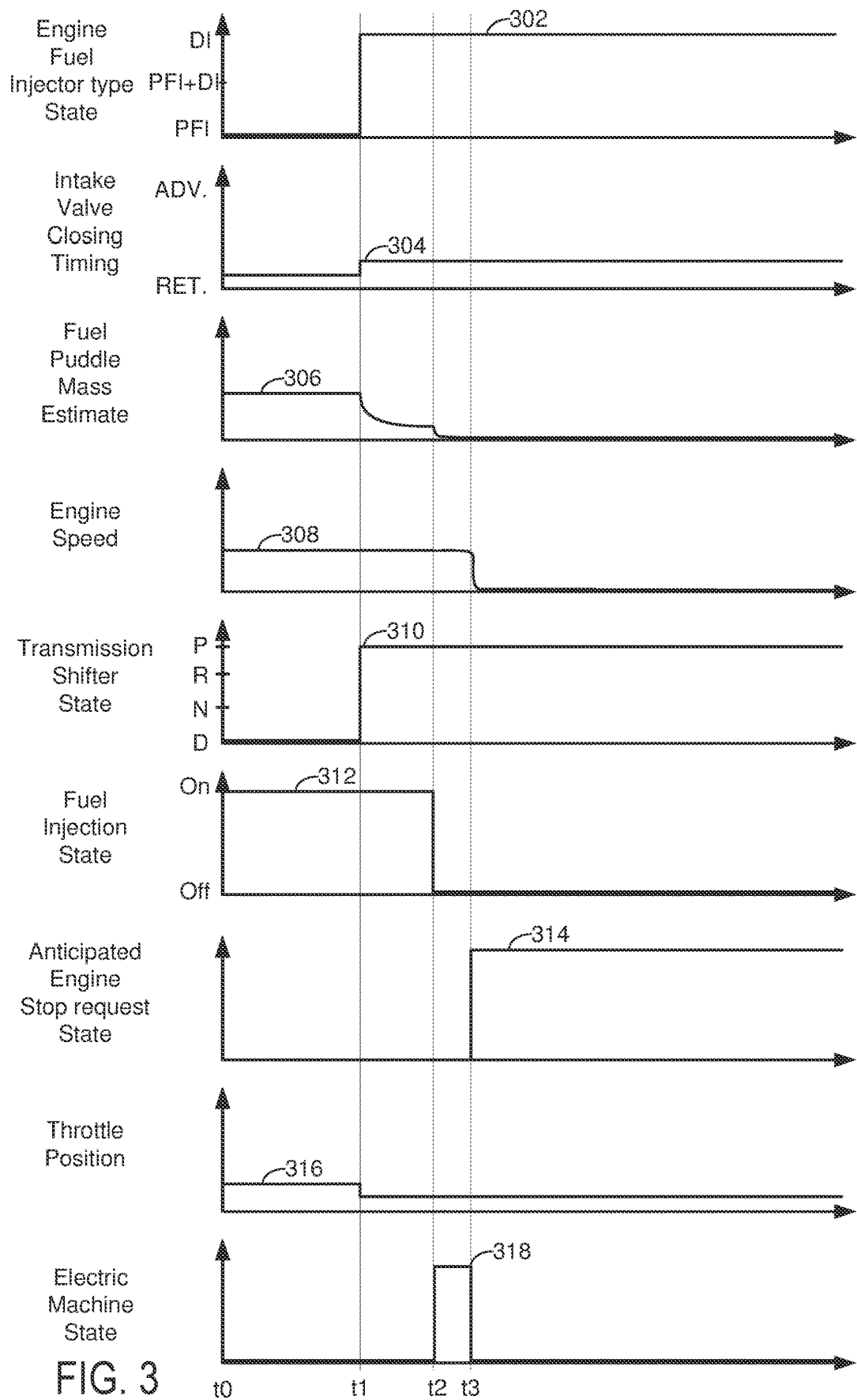
FIG. 3 shows an example engine stopping sequence according to the method of FIG. 4.

The present description is related to stopping an engine in a way that may reduce engine emissions when the engine is restarted. In particular, the engine may be stopped in a way that may reduce fuel puddles within the engine. By reducing fuel puddles within the engine when the engine is being stopped, it may be possible to reduce an amount of hydrocarbons that is pumped through the engine when the engine is restarted. The engine may be of the type shown in FIG. 1. The engine may be included in a driveline as shown in FIG. 2, or in another known hybrid driveline configurations (e.g., series or parallel), or in a non-hybrid vehicle. The engine may be stopped as shown in the sequence of FIG. 3. The engine may be stopped according to the method of FIG. 4.

Figure 1:
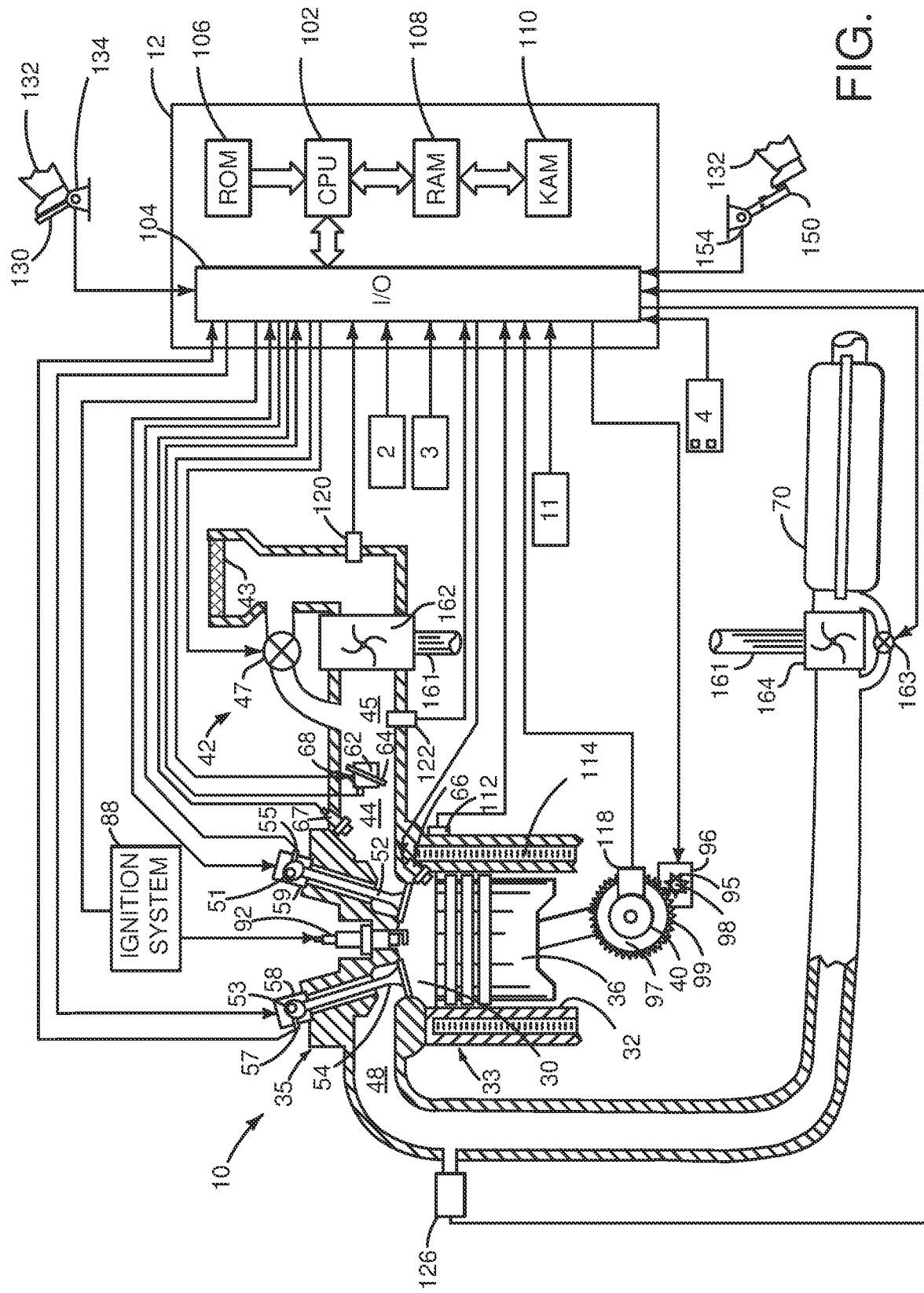
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Optional flywheel starter 96 may be directly mounted to the front of the engine or the rear of the engine. In some examples, flywheel starter 96 may selectively supply power to crankshaft 40 via a belt or chain. In addition, flywheel starter 96 is in a base state when not engaged to the engine crankshaft 40 and flywheel ring gear 99. Flywheel starter 96 may be referred to as a flywheel starter.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device. Controller 12 may also receive navigation and global positioning system (GPS) data (e.g., locations of lights, signs, roads, etc.) from GPS receiver/navigation system 2. Controller 12 may interface with other vehicles to receive traffic data (e.g., locations of other vehicles, traffic flow, etc.) from connected vehicle interface 3. Controller 12 may receive proximity data from other vehicles via vehicle proximity sensing system 4. Proximity sensing system 4 may include R.A.D.A.R., L.A.S.E.R., S.O.N.A.R, and/or other ranging sensors.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power is absorbed and converted into heat or electric charge) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park) as indicated.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Camera 265 in combination with vehicle system controller 255, or another controller, may recognize objects and features that are external to vehicle 225 and that may be a basis for generating an anticipated engine stop request. For example, camera 265 and vehicle system controller 255 may recognize that vehicle 225 is in a parking garage or is entering a parking space. This recognition may be a basis for generating an anticipated engine stop request. In particular, the vehicle system controller 255 may generate an anticipated engine stop request in response to a recognition that vehicle 225 is entering a parking garage or a parking space. The anticipated engine stop request may be output when such recognition is made or at a later time when it may be determined desirable to begin an engine shutdown before an actual engine stop request is issued by a human or an autonomous driver.

Camera 266 in combination with vehicle system controller 255, or another controller, may recognize objects and features that are internal to vehicle 225 and that may be a basis for generating an anticipated engine stop request. For example, camera 266 and vehicle system controller 255 may recognize that a person is reaching for and about to apply a pushbutton or key switch 267 to generate an actual engine stop request. Camera 266 and a controller may recognize that an engine stop is about to be requested, and the controller may generate an anticipated engine stop request that leads the actual engine stop request in time so that an engine stop may begin before the actual engine stop request is generated so that the engine may stop rotating closer to the time that the actual engine stop request is generated. In this way, camera 266 may help vehicle 225 to avoid situations where engine 10 continues to run for longer periods of time after an actual engine stop is requested. Alternatively, radio frequency receiver 269 may provide an indication that vehicle 225 is about to park via receiving parking instructions from a remote device 268, such as a server, traffic controller, etc.

Thus, the system of FIGS. 1 and 2 provides for a system, comprising: an engine; an electric machine; a vehicle stop request input device; and a controller including executable instructions stored in non-transitory memory that cause the controller to cease injecting fuel to the engine and rotate the engine via the electric machine based on input to the vehicle stop request input device. The system includes where the vehicle stop request input device is a key switch or a pushbutton. The system includes where the vehicle stop request input device is a radio frequency receiver. The system includes where the engine is rotated via the electric machine for a time duration that is based on an estimate of mass in a fuel puddle. The system includes where the time duration is increased for decreasing engine temperatures. The system includes where the time duration is increased for decreasing ambient air temperatures. The system further comprises additional instructions that cause the controller to close a throttle of the engine based on input to the vehicle stop request input device. The system further comprises additional instructions that cause the controller to adjust intake valve timing of the engine based on input to the vehicle stop request input device.

Referring now to FIG. 3, an example sequence for stopping an engine of a vehicle is shown. The sequence of FIG. 3 may be provided by the system of FIGS. 1 and 2 in cooperation with the method of FIG. 4. Vertical markers at times t0-t3 represent times of interest during the sequence. All of the plots occur at a same time.

The first plot from the top of FIG. 3 is a plot of engine fuel injector type state versus time. The vertical axis represents the engine fuel injector type state and fuel may be injected to the engine solely via direct injectors when trace 302 is at the level along the vertical axis indicated as DI. Fuel may be injected to the engine via direct fuel injectors and port fuel injectors when trace 302 is at the level along the vertical axis indicated as PFI+DI. Fuel may be injected to the engine solely via port fuel injectors when trace 302 is at the level along the vertical axis indicated as PFI. The horizontal axis represents time and time increases in the direction of the horizontal axis arrow. Trace 302 represents the engine fuel injector type state.

The second plot from the top of FIG. 3 is a plot of intake valve opening timing for the engine versus time. The vertical axis represents the intake valve opening timing and the intake valve opening timing advances in the direction of the vertical axis arrow. The horizontal axis represents time and time increases in the direction of the horizontal axis arrow. Trace 304 represents the intake valve opening timing.

The third plot from the top of FIG. 3 is a plot of a fuel puddle mass estimate for an intake port of a cylinder of the engine versus time. The vertical axis represents fuel puddle mass estimate and the fuel puddle mass estimate increases in the direction of the vertical axis arrow. The horizontal axis represents time and time increases in the direction of the horizontal axis arrow. Trace 306 represents the fuel puddle mass.

The fourth plot from the top of FIG. 3 is a plot of engine speed versus time. The vertical axis represents the engine speed and the engine speed increases in the direction of the vertical axis arrow. The horizontal axis represents time and time increases in the direction of the horizontal axis arrow. Trace 308 represents the engine speed.

The fifth plot from the top of FIG. 3 a plot of transmission shifter state versus time. The vertical axis represents the transmission shifter state and the transmission shifter is "park" when trace 310 is at the level of the "P" along the vertical axis. The transmission shifter is "reverse" when trace 310 is at the level of the "R" along the vertical axis. The transmission shifter is "neutral" when trace 310 is at the level of the "N" along the vertical axis. The transmission shifter is "drive" when trace 310 is at the level of the "D" along the vertical axis. The horizontal axis represents time and time increases in the direction of the horizontal axis arrow. Trace 310 represents the transmission shifter state.

The sixth plot from the top of FIG. 3 is a plot of engine fuel injection state versus time. The vertical axis represents the engine fuel injection state and fuel may be injected to the engine when trace 312 is at the level along the vertical axis indicated as "On." Fuel may not be injected to the engine when trace 312 is at the level of the horizontal axis. The horizontal axis represents time and time increases in the direction of the horizontal axis arrow. Trace 312 represents the state of engine fuel injection.

The seventh plot from the top of FIG. 3 is a plot of an anticipated engine stop time versus time. The vertical axis represents the anticipated engine stop time and an engine stop is anticipated at a time where trace 314 changes from a level that is near the horizontal axis to a level that is near the vertical axis arrow. The horizontal axis represents time and time increases in the direction of the horizontal axis arrow. Trace 314 represents the anticipated engine stop time.

The eighth plot from the top of FIG. 3 is a plot of engine throttle position versus time. The vertical axis represents the engine throttle position and the engine throttle opening amount increases in the direction of the vertical axis arrow. The horizontal axis represents time and time increases in the direction of the horizontal axis arrow. Trace 316 represents the engine throttle position.

The ninth plot from the top of FIG. 3 is a plot of electric machine state versus time. The vertical axis represents the electric machine state and the electric machine is activated when trace 318 is near the vertical axis arrow. The electric machine is not activated when trace 318 is near the horizontal axis. The horizontal axis represents time and time increases in the direction of the horizontal axis arrow. Trace 318 represents the electric machine state.

At time t0, the engine (not shown) is running (e.g., rotating and combusting fuel) and the fuel is being injected to the engine solely via port fuel injectors. The intake valve opening timing is retarded and the fuel puddle mass is at a middle level. The engine speed is a medium speed and the transmission shifter is engaged in the "drive" position. There is not an anticipated engine stop request and the engine throttle is partially open. The electric machine is off.

At time t1, a human driver (not shown) changes a position of the transmission shifter from "drive" to "park." The transmission shifter state change may be a basis for anticipating an engine stop request. In this example, the anticipated engine stop request is anticipated to be at time t3. The intake valve opening timing is advanced and the throttle is closed further so as to reduce masses of fuel puddles in the engine's intake ports. The estimated fuel puddle mass begins to decline and fuel continues to be injected to the engine, but the fuel injection type is switched from port fuel injection (PFI) only to direct fuel injection (DI) only so that the fuel puddle mass may be further reduced. Port fuel injection may increase fuel puddle mass as compared to injecting fuel via only direct fuel injection. Therefore, port fuel injection is ceased. The electric machine is not activated and the engine rotates under its own power.

At time t2, the transmission shifter remains in "park" and time is near the anticipated engine stop request time so fuel injection to the engine is ceased. The electric machine is activated and it rotates the engine so that the engine may remain rotating until the actual engine stop request is generated, a threshold amount of time passes, or driver demand torque is increased. Rotating the engine unfueled (e.g., without injecting fuel to the engine) may prevent additional fuel from entering puddles in the engine and draw fuel from the puddles through the engine and into the exhaust system catalyst where the fuel may be oxidized and converted into $CO_2$ and $H_2O$. The engine may be rotated at a same speed as when the engine was fueled immediately before fuel injection to the engine ceased. The throttle remains closed and the intake valve opening timing remains advanced.

At time t3, the actual engine stop request (not shown) is asserted and the electric machine is deactivated so as to allow the engine speed to decline. Fuel is not injected to the engine and the fuel puddle mass is low. The transmission shifter remains engaged in park and the throttle remains closed.

Thus, by anticipating an engine stop request time, operation of an engine may be adjusted before the actual time of an engine stop request so that a larger amount of fuel may be extracted from fuel puddles in the engine. Smaller fuel puddles during engine starting may translate into lower hydrocarbon emissions during engine starting. In addition, an electric machine may rotate the engine unfueled for a period of time so as to further remove fuel from fuel puddles in the engine.

Figure 4:
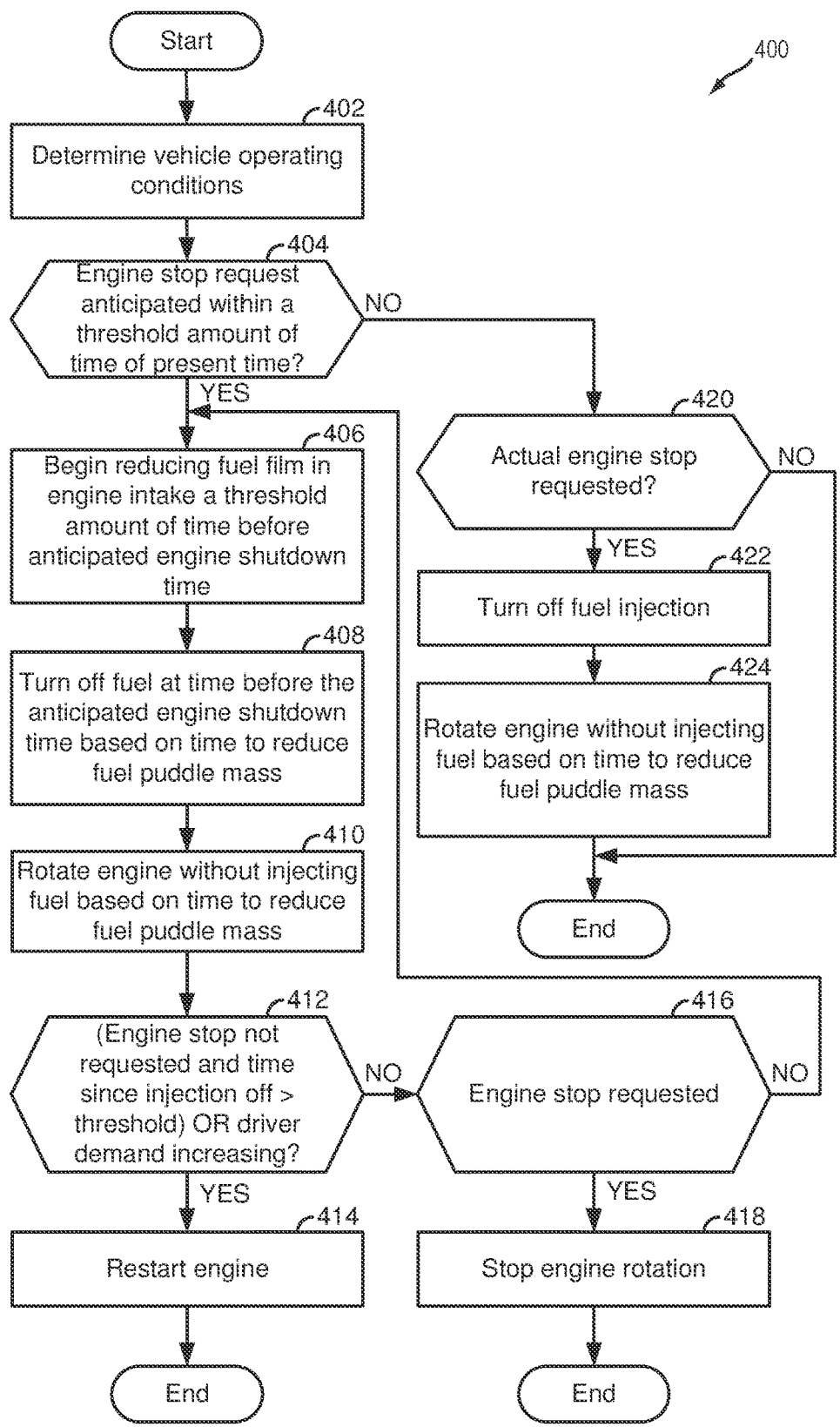
FIG. 4 shows an example method for stopping an engine in a way that may reduce engine emissions when the engine is restarted.

Turning now to FIG. 4, a flowchart of a method for stopping an internal combustion engine of a vehicle is shown. The method of FIG. 4 may be incorporated into and may cooperate with the system of FIGS. 1-2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may be determined from the vehicle's various sensors and actuators. The vehicle operating conditions may include, but are not limited to engine speed, vehicle speed, driver demand torque, ambient air temperature, barometric pressure, vehicle position, proximity of other vehicles to the present vehicle, traffic signaling device locations, and battery state of charge. Method 400 proceeds to 404.

At 404, method 400 judges if an engine stop is anticipated within a threshold amount of time relative to the present time. Method 400 may anticipate that an engine stop will be requested within a threshold amount of time in several ways. In one example, method 400 may anticipate that an engine stop will be requested within a threshold amount of time of the present time based on the vehicle's present location and the vehicle's destination. For example, if method 400 judges that the vehicle is within 200 meters of its destination that has been input to a navigation system, the answer may be yes. In another example, method 400 may anticipate that an engine stop will be requested within a threshold amount of time of the present time based on the data from a camera or output of the camera. For example, if method 400 judges that the vehicle is entering a parking garage, entering a parking space, or recognizes that a vehicle occupant is about to press an engine or vehicle off pushbutton or key switch, the answer may be yes. In still another example, method 400 may anticipate that an engine stop will be requested within a threshold amount of time of the present time based on a position of a transmission shift lever or input device (e.g., selector, etc.). For example, if method 400 recognizes a transmission shifter input changes from drive to park, drive to neutral, reverse to park, or reverse to neutral, the answer may be yes. If the answer is yes, method 400 proceeds to 406. Otherwise, if the answer is no, method 400 proceeds to 420.

Method 400 may also determine a time in the future that the anticipated engine stop request is expected to occur. In one example, method 400 may divide the distance between the vehicle's present location and the vehicle's destination by the vehicle's speed to determine an amount of time to reach the vehicle's destination. The amount of time to reach the vehicle's destination may be added to the present time to determine the anticipated time that the vehicle's engine is expected to be requested to stop. In another example, the anticipated engine stop request may be determined based on the vehicle's past history. For example, if an amount of time between when a vehicle occupant reaches to apply an engine stop pushbutton or key switch and a time that an engine stop request is generated averages to 0.5 seconds, then method 400 may judge that an engine stop request is expected to occur 0.5 seconds after a camera and/or controller recognizes that a vehicle passenger is reaching to apply an engine stop pushbutton or key switch to generate an engine stop request. Thus, the anticipated engine stop request time may be a time that is 0.5 seconds after the camera and/or controller recognizes that a vehicle occupant is reaching for the engine stop pushbutton or key switch.

At 406, method 400 begins to reduce a fuel film and fuel puddles in the engine a threshold amount of time before the anticipated engine stop request is expected to occur. Thus, the mass of fuel stored in fuel films or puddles within the engine may begin to be reduced before the time that the engine is anticipated to be requested to stop. In one example, method 400 may close an engine throttle to reduce intake manifold pressure and advance intake valve opening time to increase or maintain air flow through the engine while reducing fuel mass in the engine. In addition, method 400 may switch from injecting fuel only via port fuel injection to injecting fuel only via direct fuel injection. Alternatively, method 400 may switch from injecting fuel to the engine via port injectors and direct injectors to injecting fuel to the engine via only via direct fuel injectors. Method 400 may also increase engine speed (e.g., increase engine idle speed) before fueling to the engine is stopped, so that inertia causes the engine to continue spinning long enough to flush out fuel films. Method 400 proceeds to 408.

At 408, method 400 may cease to inject fuel to the engine at a time that is before and based on a time of the anticipated engine stop request. In one example, the time may be based on an amount of time that it is expected for the fuel film and puddles to deplete.

Method 400 may continuously estimate a mass of fuel that is in the fuel puddles within the engine via the following equation:

$$FPM = K1 \cdot ECT + K2 \cdot ACT + K3 \cdot PFI + K4 \cdot DI + K5 \cdot \overline{MAP}$$

$$ECYLDEP = FPM/MRPC$$

where FPM is the estimated fuel puddle mass in the engine that is to be depleted, K1 is a first function, ECT is engine temperature, K2 is a second function, ACT is air temperature in the intake manifold, K3 is a third function, PFI is a port fuel injection mass rate of injection, K4 is a fourth function, DI is a direct fuel injection mass rate of injection, K5 is a fifth function, $\overline{MAP}$ is a one second average of intake manifold pressure, ECYLDEP is an actual total number of engine cycles to deplete the fuel puddle mass in the engine, and MRPC is the mass of fuel that is removed from the engine each engine cycle that is due to the fuel puddle mass reduction actions. The value of MRPC may be estimated as a function of engine operating conditions such as MAP, intake valve opening timing, engine speed, and engine temperature. The amount of time to deplete the fuel mass from the engine (TDFM) may be determined by dividing the value of ECYLDEP by the speed of the engine in revolutions/minute.

Method 400 may subtract the value of TDFM from the anticipated engine stop time to determine when to cease injecting fuel to the engine. The fuel injection may be commanded off at the determined time. Thus, fuel injection to the engine may be ceased before the time that an engine stop is anticipated to occur. This allows the fuel mass to be flushed from the engine so that the engine may be stopped closer to the time that the engine is actually requested to stop so that the engine may not have to continue to be rotated after an engine stop is requested to remove fuel from the engine. Method 400 proceeds to 410.

At 410, method 400 may rotate the engine via an electric machine while the engine is not fueled so that residual fuel that is stored in films and puddles in the engine may be flushed from the engine and processed in an activated catalyst. Such actions may reduce an amount of hydrocarbons that may be pumped from the engine during a subsequent engine start. The engine may be rotated via a flywheel starter (e.g., 96), ISG (e.g., 240), or BISG (e.g., 219). The engine speed may be maintained via the electric machine while the engine is not fueled. If the vehicle does not include an electric machine to rotate the engine or if the electric machine is unavailable to rotate the engine, the engine speed may be reduced from an elevated speed as previously mentioned. Method 400 proceeds to 412.

At 412, method 400 judges if an actual engine stop (e.g., an engine stop that is requested by a human or an engine stop that is requested via an autonomous driver) has not been requested and a time since injection of fuel to the engine was most recently stopped is greater than a threshold amount of time. In addition, method 400 may judge if driver demand torque or power is increasing. If method 400 judges that an engine stop has not been requested and an amount of time since ceasing to inject fuel to the engine is greater than a threshold, or if driver demand torque or power is increasing, the answer is yes and method 400 proceeds to 414. Otherwise, the answer is no and method 400 proceeds to 416.

At 414, method 400 restarts the engine via supplying fuel and spark to the engine. Method 400 may meet driver demand torque or power with engine output once the engine is started. Method 400 proceeds to exit.

At 416, method 400 judges if an actual engine stop is requested. Method 400 may judge if an actual engine stop has been requested based on an operating state of a pushbutton, key switch, or other device. If method 400 judges that an actual engine stop is requested, the answer is yes and method 400 proceeds to 418. Otherwise, the answer is no and method 400 returns to 406.

At 418, method 400 ceases rotating the engine via the electric machine. The electric machine may be commanded to zero speed and electric power may be removed from the electric machine. Method 400 proceeds to exit.

At 420, method 400 judges if an actual engine stop is requested. If so, the answer is yes and method 400 proceeds to 422. Otherwise, the answer is no and method 400 exits.

At 422, method 400 ceases injecting fuel to the engine. Method 400 proceeds to 424 after fuel injection to the engine ceases.

At 424, method 400 rotates the engine via an electric machine while the engine is not fueled so that residual fuel that is stored in films and puddles in the engine may be flushed from the engine and processed in an activated catalyst. Such actions may reduce an amount of hydrocarbons that may be pumped from the engine during a subsequent engine start. The engine may be rotated via a flywheel starter, ISG (e.g., 240), or BISG (e.g., 219) for a total number of engine revolutions that is equal to the value of ECYLDEP. The value of ECYLDEP may be determined as previously described at step 408. Method 400 proceeds to exit.

Thus, method 400 may reduce a mass of fuel that is held within the engine when the engine is stopped so that fewer hydrocarbons may be ejected from the engine during a subsequent engine restart. The amount of fuel mass within the engine may be reduced via switching the engine to direct fuel injection, adjusting a throttle opening amount, adjusting intake valve timing, and other actions.

The method of FIG. 4 provides for a method for stopping an engine, comprising: ceasing to supply fuel to an engine via a controller based on an anticipated engine stop request; and supplying fuel to the engine via the controller a predetermined amount of time after ceasing to supply fuel to the engine based on the anticipated engine stop request. The method includes where the supplying fuel to the engine occurs in absence of an engine stop request. The method includes where the anticipated engine stop request is based on changing a position of a transmission gear shift lever. The method includes where the anticipated engine stop request is based on a vehicle being within a threshold distance of a destination of the vehicle. The method includes where the anticipated engine stop request is based on an indication that a vehicle input is about to be applied. The method includes where the vehicle input is about to be applied is based on output of a camera. The method includes where the anticipated engine stop request is based on output of a camera.

The method of FIG. 4 also provides for a method for stopping an engine, comprising: ceasing to supply fuel to an engine via port fuel injectors and supplying fuel to the engine via direct fuel injectors based on an anticipated engine stop request. The method further comprises ceasing to inject fuel to the engine via the direct fuel injectors based on an engine stop request. The method further comprises rotating the engine via an electric machine based on the anticipated engine stop request. The method includes where the electric machine is a flywheel starter. The method includes where the electric machine is an integrated starter/generator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for stopping an engine, comprising:
    ceasing to supply fuel to an engine via a controller based on an anticipated engine stop request; and
    supplying fuel to the engine via the controller a predetermined amount of time after ceasing to supply fuel to the engine based on the anticipated engine stop request.

2. The method of claim 1, where the supplying fuel to the engine occurs in absence of an engine stop request.

3. The method of claim 1, where the anticipated engine stop request is based on changing a position of a transmission gear shift lever.

4. The method of claim 1, where the anticipated engine stop request is based on a vehicle being within a threshold distance of a destination of the vehicle.

5. The method of claim 1, where the anticipated engine stop request is based on an indication that a vehicle input is about to be applied.

6. The method of claim 5, where the vehicle input is about to be applied is based on output of a camera.

7. The method of claim 1, where the anticipated engine stop request is based on output of a camera.

8. A system, comprising:
    an engine;
    an electric machine;
    a vehicle stop request input device; and
    a controller including executable instructions stored in non-transitory memory that cause the controller to cease injecting fuel to the engine and rotate the engine via the electric machine based on input to the vehicle stop request input device.

9. The system of claim 8, where the vehicle stop request input device is a key switch or a pushbutton.

10. The system of claim 8, where the vehicle stop request input device is a radio frequency receiver.

11. The system of claim 8, where the engine is rotated via the electric machine for a time duration that is based on an estimate of mass in a fuel puddle.

12. The system of claim 11, where the time duration is increased for decreasing engine temperatures.

13. The system of claim 11, where the time duration is increased for decreasing ambient air temperatures.

14. The system of claim 8, further comprising additional instructions that cause the controller to close a throttle of the engine based on input to the vehicle stop request input device.

15. The system of claim 8, further comprising additional instructions that cause the controller to adjust intake valve timing of the engine based on input to the vehicle stop request input device.

16. A method for stopping an engine, comprising:
    ceasing to supply fuel to an engine via port fuel injectors and supplying fuel to the engine via direct fuel injectors based on an anticipated engine stop request; and rotating the engine via an electric machine based on the anticipated engine stop request.

17. The method of claim 16, further comprising ceasing to inject fuel to the engine via the direct fuel injectors based on an engine stop request.

18. The method of claim 16, where the electric machine is a flywheel starter.

19. The method of claim 16, where the electric machine is an integrated starter/generator.

\* \* \* \* \*